(12) United States Patent
Fujisaki et al.

(10) Patent No.: US 8,292,437 B2
(45) Date of Patent: Oct. 23, 2012

(54) VIDEO PROJECTOR

(75) Inventors: Takeshi Fujisaki, Amagasaki (JP); Kazunobu Oketani, Yawata (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 356 days.

(21) Appl. No.: 12/692,479

(22) Filed: Jan. 22, 2010

(65) Prior Publication Data

US 2010/0214497 A1 Aug. 26, 2010

(30) Foreign Application Priority Data

Feb. 24, 2009 (JP) ................. 2009-041417

(51) Int. Cl.
*G03B 21/20* (2006.01)
*G03B 21/14* (2006.01)
*G03B 21/16* (2006.01)
*G03B 21/18* (2006.01)
*G09G 3/30* (2006.01)
*G09G 5/10* (2006.01)

(52) U.S. Cl. ............... 353/85; 353/88; 353/52; 345/77; 345/690

(58) Field of Classification Search ............ 353/52, 353/85, 31, 88
See application file for complete search history.

(56) References Cited

U.S. PATENT DOCUMENTS

| | | | |
|---|---|---|---|
| 2003/0020884 A1* | 1/2003 | Okada et al. | 353/57 |
| 2004/0263801 A1 | 12/2004 | Totani et al. | |
| 2006/0268021 A1* | 11/2006 | Lin et al. | 345/690 |
| 2007/0268242 A1 | 11/2007 | Baba et al. | |

FOREIGN PATENT DOCUMENTS

| | | |
|---|---|---|
| JP | 5-66501 A | 3/1993 |
| JP | 2002-23106 A | 1/2002 |
| JP | 2006-343767 A | 12/2006 |
| JP | 2007-11393 A | 1/2007 |
| JP | 2007-310232 A | 11/2007 |
| JP | 2008-170768 A | 7/2008 |
| JP | 2009-031623 A | 2/2009 |
| WO | 2005015894 A2 | 2/2005 |
| WO | 2005015894 A3 | 10/2005 |

OTHER PUBLICATIONS

Extended European Search Report from corresponding EP Application No. 09015960.9; dated Apr. 23, 2010.
Japanese Office Action issued on Apr. 26, 2011 in the corresponding Japanese Patent Application No. 2009-041417.

* cited by examiner

*Primary Examiner* — William C Dowling
*Assistant Examiner* — Ryan Howard
(74) *Attorney, Agent, or Firm* — Novak Druce + Quigg LLP

(57) ABSTRACT

A video projector for displaying a picture based on a video signal. The video projector includes a first LCD panel for red light, a second LCD panel for green light, and a third LCD panel for blue light. A light source emits light toward the first to third LCD panels. A modulated light computer determines a correction coefficient for reducing the amount of light emitted from the light source toward the first to third LCD panels when temperature load of at least one of the first to third LCD panels increases. An emitted light amount control unit corrects the video signal with the correction coefficient and controls the amount of light emitted from the light source toward the first to third LCD panels.

13 Claims, 4 Drawing Sheets

VIDEO PROJECTOR

CROSS-REFERENCE TO RELATED APPLICATIONS

This application is based upon and claims the benefit of priority from prior Japanese Patent Application No. 2009-041417, filed on Feb. 24, 2009, the entire contents of which are incorporated herein by reference.

BACKGROUND OF THE INVENTION

The present invention relates to a video projector, and more particularly, to a video projector that varies the amount of light emitted from a light source in accordance with an average picture level for each displayed picture of a video signal.

One example of a video projector is a liquid crystal display (LCD) projector. A conventional LCD projector includes a controller, LCD light valves, a light source, and a controller. The LCD light valves include a red light valve, a green light valve, and a blue light valve, each of which forms an LCD panel. The light source emits light toward the LCD light valves. The controller controls the amount of light emitted from the light source toward the LCD panels in accordance with an average picture level for each displayed picture of a video signal.

Japanese Laid-Open Patent Publication No. 5-66501 describes an LCD projector, which includes a brightness detection circuit and a light source brightness modulation circuit. The brightness detection circuit detects an average picture level APL for each displayed picture of a video signal. The light source brightness modulation circuit varies the brightness of a light source in accordance with the average picture level APL, which is detected by the brightness detection circuit. When the video signal is for an entirely dark picture, that is, when the average picture level APL is low, the amount of light emitted from the light source is decreased. When the video signal is for an entirely bright picture, that is, when the average picture level APL is high, the amount of light emitted from the light source is increased. In this manner, the amount of light emitted from the light source toward the LCD panels is controlled in accordance with an average picture level for each displayed picture of a video signal to improve the contrast of a picture, which is projected onto a screen. This lowers power consumption.

Japanese Laid-Open Patent Publication Nos. 2002-23106 and 2007-11393 describe the adjustment of the amount of light emitted from the light source toward the LCD panels by controlling the amount of light blocked by a light shield (lamp iris), which is arranged at the light emission side of the light source, in accordance with the average picture level APL.

Japanese Laid-Open Patent Publication No. 2006-343767 describes the adjustment of the amount of light emitted from the light source toward the LCD panels by controlling the amount of light emitted from the light source and the amount of light blocked by a light shield, which is arranged at the light emission side of the light source, in accordance with the average picture level APL.

The average brightness level APL is generally calculated from the simple equation shown below.

$$APL=0.3R+0.6G+0.1B$$

In the above equation, R represents the average picture level of a video signal sent to the red LCD panel and normalized to a maximum value X, G represents the average picture level of a video signal sent to the green LCD panel and normalized to a maximum value X, and B represents the average picture level of a video signal sent to the blue LCD panel and normalized to a maximum value X. Here, X is a constant that is predetermined by the number of bits in a computer. For example, X is 255 for eight bits and 1023 for ten bits.

However, in the above-described video projectors, the amount of light emitted from the light source toward the LCD panels is controlled in accordance with only the average picture level APL. Thus, when a video signal is generated so that some of the LCD panels become nearly fully closed or fully open, the temperature load applied to such LCD panels increases. For example, the generation of a video signal for a purple or mainly purple picture increases the average picture levels of the red and blue LCD panels and fully closes or nearly fully closes the green LCD panel. Thus, the temperature load applied to the green LCD panel becomes excessively high. Further, the generation of a video signal for a yellow or mainly yellow picture increases the average picture levels of the red and green LCD panels and fully closes or nearly fully closes the blue LCD panel. In this case, the average picture level APL, which is calculated from the above equation, is higher than when generating the purple or mainly purple video signal. This increases the amount of light emitted from a light source lamp toward the LCD panels. As a result, the temperature load applied to the blue LCD panel is apt to become higher than the temperature load applied to the green LCD panel.

Accordingly, it is desirable that a video projector be provided to adjust the amount of light emitted toward the LCD panels so that the temperature load applied to some of the red, green, and blue LCD panels does not become excessively high.

SUMMARY OF THE INVENTION

One aspect of the present invention is a video projector for displaying a picture based on a video signal. The video projector includes a first LCD panel for red light, a second LCD panel for green light, and a third LCD panel for blue light. A light source emits light toward the first to third LCD panels. A modulated light computer determines a correction coefficient for reducing the amount of light emitted from the light source toward the first to third LCD panels when temperature load of at least one of the first to third LCD panels increases. An emitted light amount control unit corrects the video signal with the correction coefficient and controls the amount of light emitted from the light source toward the first to third LCD panels.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

A video projector according to a first embodiment of the present invention will now be discussed with reference to the drawings.

Figure 1:
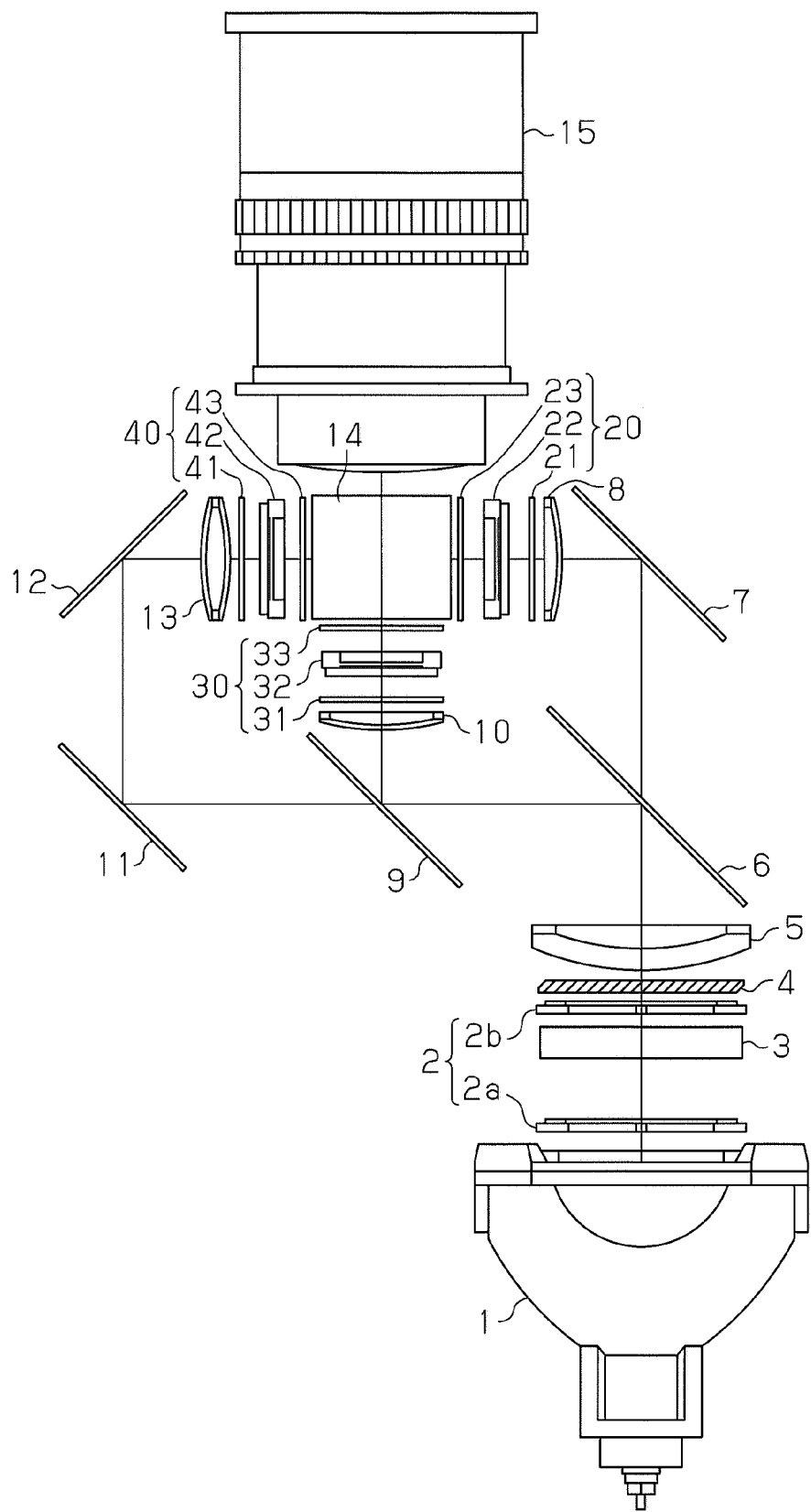
FIG. 1 is a schematic diagram of an optical system in a video projector according to a first embodiment of the present invention.

Referring to the optical schematic diagram of FIG. 1, the video projector of this embodiment is a three-panel type LCD projector. A light source 1 has a light emitting body, which is a discharge lamp, such as a metal halide lamp or a super-high pressure mercury lamp. The light emitted from the light emitting body of the lamp 1 is converted to parallel light by a reflector before being emitted from the light source 1. The light emitted from the light source 1 is transferred from an integrator lens 2 to a light shield 3, a polarization converter 4, a condenser lens 5, and then a first dichroic mirror 6.

The integrator lens 2 includes two lens groups 2a and 2b (fly's eye lenses), in which each lens is formed to guide the light emitted from the light source 1 to the entire surface of red, green, and blue liquid crystal light panels 22, 32, and 42. This averages brightness differences in parts of the light emitted from the light source 1 and reduces the difference in the amount of light between a central portion and peripheral portion of a picture.

Figure 2:
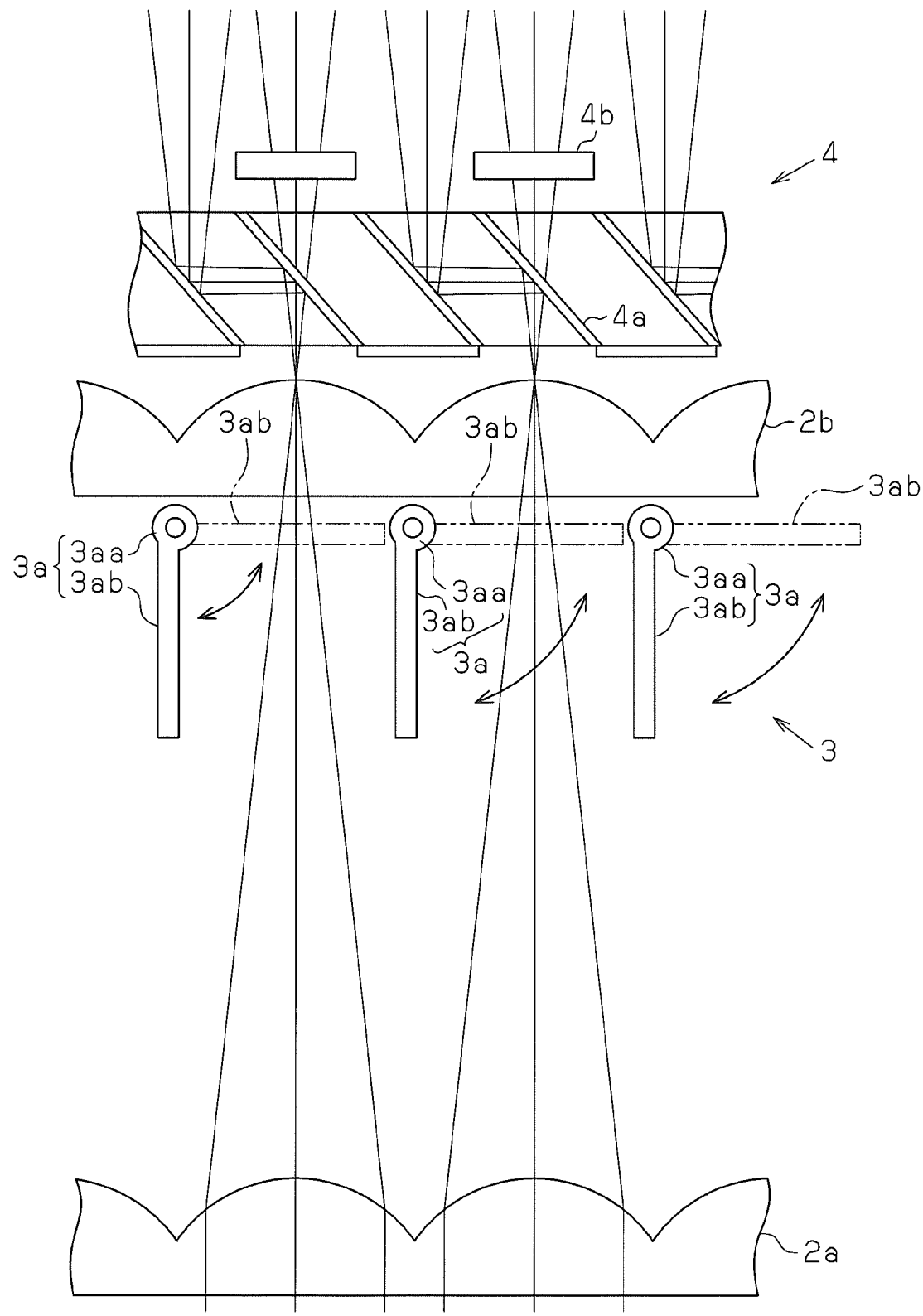
FIG. 2 is an enlarged view showing the vicinity of an integrator lens in the video projector of FIG. 1.

Referring to the enlarged view of FIG. 2, which shows the vicinity of the integrator lens 2, the light shield 3 includes shutters 3a. Each shutter 3a is arranged near the lens group 2b, which is located in the vicinity of the polarization converter 4, at a position where it does not interfere with the passage of effective illumination light. Further, each shutter 3a includes a shaft 3aa and a light shield plate 3ab, which is fixed to the shaft 3aa. The shutter 3a is driven to rotate the shaft 3aa by 90° and control the amount of light emitted from the light source 1.

The polarization converter 4 includes a polarization beam splitter (PBS) array, as shown in FIG. 2. The PBS array includes polarization splitting films 4a and phase difference plates (½λ plates) 4b. For the light from the integrator lens 2, each polarization splitting film 4a of the PBS array transmits P-polarized light and changes the optical path of S-polarized light by 90°. The P-polarized light transmitted through the polarization splitting film 4a is converted into S-polarized light by the corresponding phase difference plate 4b, which is arranged frontward from (at the light emission side of) the polarization splitting film 4a. Thus, in the above setting, most of the light is converted to S-polarized light.

The first dichroic mirror 6 transmits light in the red wavelength band and reflects light in the cyan (green+blue) wavelength band. A reflection mirror 7 reflects and changes the optical path of the red wavelength band light transmitted through the first dichroic mirror 6. The red light reflected by the reflection mirror 7 is guided via a relay lens 8 to a red light transmissive type LCD light valve 20. The LCD light valve 20 transmits and light-modulates the red light. The cyan wavelength band light reflected by the first dichroic mirror 6 is guided to a second dichroic mirror 9.

The second dichroic mirror 9 transmits light in the blue wavelength band and reflects light in the green wavelength band. The green wavelength band light reflected by the second dichroic mirror 9 is guided via a relay lens 10 to a green light transmissive type LCD light valve 30. The LCD light valve 30 transmits and light-modulates the green light. The blue wavelength band light transmitted through the second dichroic mirror 9 is guided via full reflection mirrors 11 and 12 and a relay lens 13 to a blue light transmissive type LCD light valve 40. The LCD light valve 40 transmits and light-modulates the blue light.

The LCD light valves 20, 30, and 40 respectively include incident side polarization plates 21, 31, and 41, LCD panels 22, 32, and 42, which seal liquid crystal between two glass substrates (on which pixel electrodes and orientation films are formed), and emission side polarization plates 23, 33, and 43.

A cross dichroic prism 14 combines the modulated lights (picture light for each color), which are modulated when passing through the LCD light valves 20, 30, and 40, to form colored picture light. A projection lens 15 enlarges and projects the colored picture light onto a screen (not shown).

Figure 3:
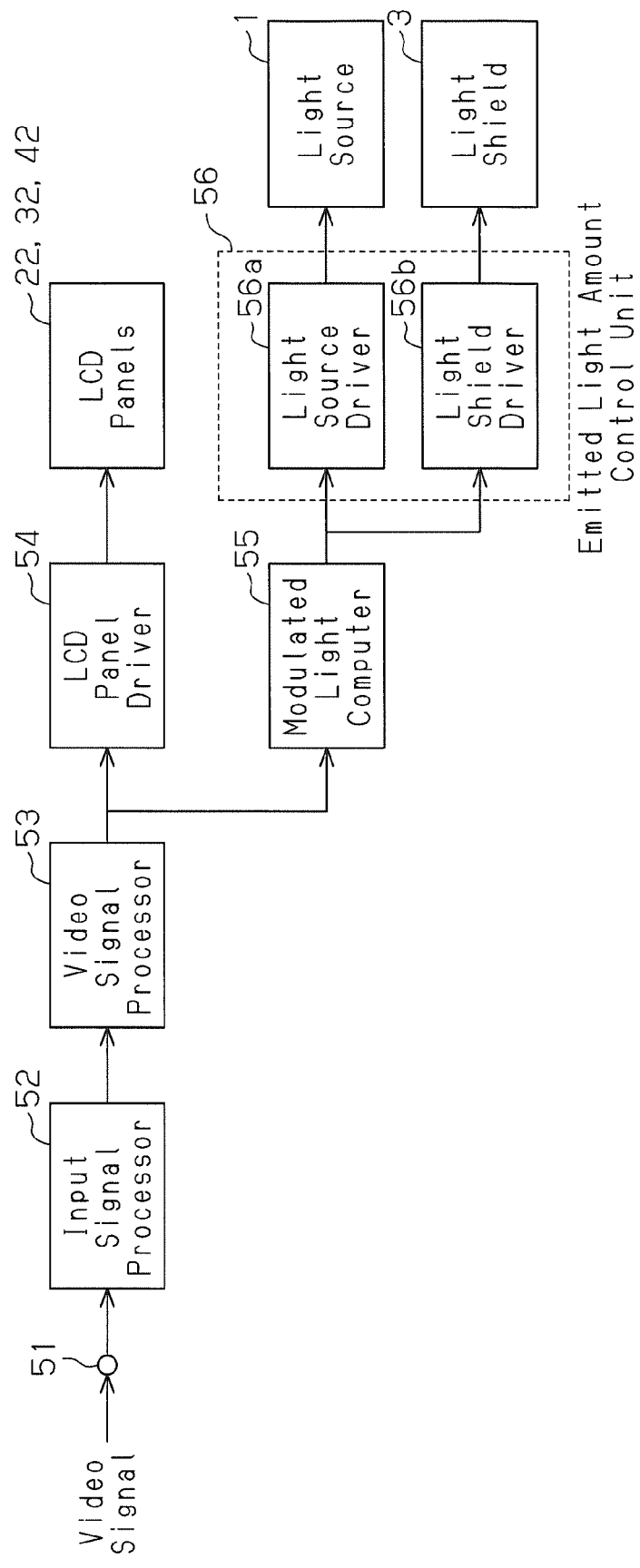
FIG. 3 is a functional block diagram of a control system in the video projector of FIG. 1.

FIG. 3 shows a control circuit for the video projector. An input terminal 51 receives an input signal and sends the input signal to an input signal processor 52, which includes various types of input interfaces. When receiving a video signal, the input signal processor 52 performs processing, such as A/D conversion or decoding, on the input video signal and sends the processed video signal to a video signal processor 53.

The video signal processor 53 performs normal picture processing, such as scaling and gamma correction, on the video signal. After undergoing such processes, the video signal is sent to an LCD panel driver 54 and modulated light computer 55. The LCD panel driver 54 converts the input video signal into signal formats for driving the red, green, and blue LCD panels 22, 32, and 42. Simultaneously, the LCD panel driver 54 generates drive pulses for driving the LCD panels 22, 32, and 42. Then, the LCD panel driver 54 sends the format-converted signals and drive pulses to the LCD panels 22, 32, and 42.

From a brightness signal component of the video signal provided from the video signal processor 53, the modulated light computer 55 obtains the average picture level for each of the red, green, and blue LCD panels. Then, the video signal processor 53 generates data indicating the average picture level APL for each displayed picture of a video signal. The average picture level APL is calculated using the next equation, which is known in the prior art.

$$APL = 0.3R + 0.6G + 0.1B$$

In the above equation, R represents the average picture level of a video signal sent to the red LCD panel and normalized to a maximum value X, G represents the average picture level of a video signal sent to the green LCD panel and normalized to a maximum value X, and B represents the average picture level of a video signal sent to the blue LCD panel and normalized to a maximum value X. Here, X is a constant that is predetermined by the number of bits of the modulated light computer 55. For example, for the modulated light computer 55, X is 255 when the number of bits is eight and 1023 when the number of bits is ten. Normally, when the average picture level APL is used, the average value that is used is for four successive frame periods of the average picture level APL, which is calculated from the above equation.

The modulated light computer 55 calculates a correction coefficient COE, which controls the amount of light emitted from the light source 1 toward the LCD panels 22, 32, and 42. The computation result is sent to a light source driver 56a and a light shield driver 56b, which form an emitted light amount control unit 56. This controls the output of the light source 1 and the amount of light blocked by the light shield 3 so that the amount of light emitted from the light source 1 to each of the LCD panels 22, 32, and 42 conforms to a modulated light level PRM, which is corrected based on the correction coefficient COE.

The correction coefficient COE and the light adjustment level PRM are computed as described below.

First, the modulated light computer 55 uses equation 1 to calculate an average level difference parameter SAT from the average picture levels R, G, and B of the red, green, and blue LCD panels.

$$SAT=X-(\max(R,G,B)-\min(R,G,B)) \quad \text{equation 1}$$

In equation 1, X is used in the same manner as in the equation used to calculate the average picture level APL described above. Further, for the video signal sent to the red, green, and blue LCD panels, max(R, G, B) represents the highest, or maximum, one of the average picture levels R, G, and B, and min(R, G, B) represents the lowest, or minimum, one of the average picture levels R, G, and B.

Generally, when the average picture levels R, G, and B of the red, green, and blue LCD panels 22, 32, and 42 decreases, the heat absorbed by the LCD panels 22, 32, and 42 increases. This increases the temperature load. Accordingly, among the red, green, and blue LCD panels 22, 32, and 42, the one having the highest temperature load is the LCD panel having the lowest one of the average picture levels R, G, and B. Further, when the differential value of the maximum value max(R, G, B) and the minimum value min(R, G, B) increases, the average level difference parameter SAT decreases. As the average level difference parameter SAT decreases, endothermic reactions increase in the LCD panel having the lowest one of the average picture levels R, G, and B. This also increases the temperature load of the LCD panel. In this manner, the parameter SAT represents the amount of the difference or deviation between the average picture levels R, G, and B. When there is a difference or deviation between the average picture levels R, G, and B, a temperature load is applied to at least one of the LCD panels 22, 32, and 42.

Further, the modulated light computer 55 calculates the correction coefficient COE from equation 2, which is shown below.

$$COE=(SAT+K)/(K+X) \quad \text{equation 2}$$

In this equation, K represents a constant that is predetermined from 0 to X. Here, X is used in the same manner as in the equation used to calculate the average picture level APL described above. The value of constant K is obtained beforehand through experiments so that the temperature load applied to the LCD panels 22, 32, and 42 does not become excessively high when the average level difference parameter SAT changes.

Figure 4:
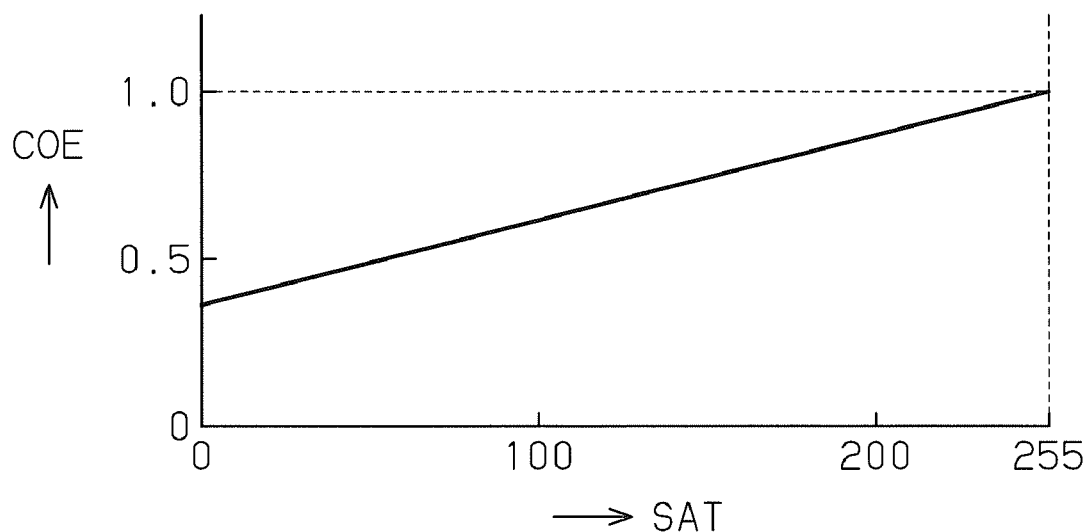
FIG. 4 is a chart illustrating the computation result of a modulated light computer and shows the relationship between an average level difference parameter SAT and a correction coefficient COE.

FIG. 4 shows the relationship between the correction coefficient COE, which is calculated in equation 2, and the average level difference parameter SAT when the modulated light computer 55 has eight bits. As shown in FIG. 4, when the parameter SAT is 0, the correction coefficient COE is a fixed value of 1 or less. When the parameter SAT is 255, the correction coefficient COE is 1. The correction coefficient COE is determined so that it linearly varies between the maximum value (1) and the minimum value in accordance with the parameter SAT.

Based on the correction coefficient COE calculated in this manner, the modulated light computer 55 calculates the modulated light level PRM of the light emitted from the red, green, and blue LCD panels 22, 32, and 42 using equation 3, which is shown below.

$$PRM=APL \times COE \quad \text{equation 3}$$

The modulated light level PRM is provided to the emitted light amount control unit 56. The light source driver 56a of the emitted light amount control unit 56 controls the amount of light generated by the light source 1 and emitted from the LCD panels 22, 32, and 42 to conform to the modulated light level PRM. Further, the light shield driver 56b of the emitted light amount control unit 56 adjusts the amount of light blocked by the light shield 3 and controls the amount of emitted light transmitted to the LCD panels 22, 32, and 42 via the light shield 3 to conform to the adjusted light level PRM.

The video projector of the first embodiment has the advantages described below.

(1) When the temperature load applied to at least one of the red, green, and blue LCD panels 22, 32, and 24 increases, the emitted light amount control unit 56 corrects the average picture level APL for each picture (i.e., video signal) with the correction coefficient COE and reduces the amount of light emitted from the light source 1 toward the LCD panels 22, 32, and 42. This prevents the temperature load applied to the LCD panels 22, 32, and 42 from becoming excessively high.

(2) As the average level difference parameter SAT represented by equation 1 decreases, the modulated light computer 55 determines the correction coefficient COE so as to further reduce the amount of light emitted from the light source 1 toward the LCD panels 22, 32, and 42. This prevents the temperature load applied to any one of the LCD panels 22, 32, and 42 from becoming excessively high by using data obtained beforehand through experiments.

(3) The modulated light computer 55 linearly varies the correction coefficient COE for the average level difference parameter SAT based on the predetermined equation. Thus, the correction coefficient COE is easily obtained.

(4) The emitted light amount control unit 56 includes the light source driver 56a, which controls the amount of light emitted from the light source 1, and the light shield driver 56b, which controls the amount of light blocked by the light shield 3 arranged between the light source 1 and the LCD panels 22, 32, and 42. Further, the emitted light amount control unit 56 simultaneously controls the amount of light emitted from the light source 1 and the amount of light blocked by the light shield 3. This lowers power consumption while reducing the temperature load applied to the LCD panels 22, 32, and 42.

Second Embodiment

Figure 5:
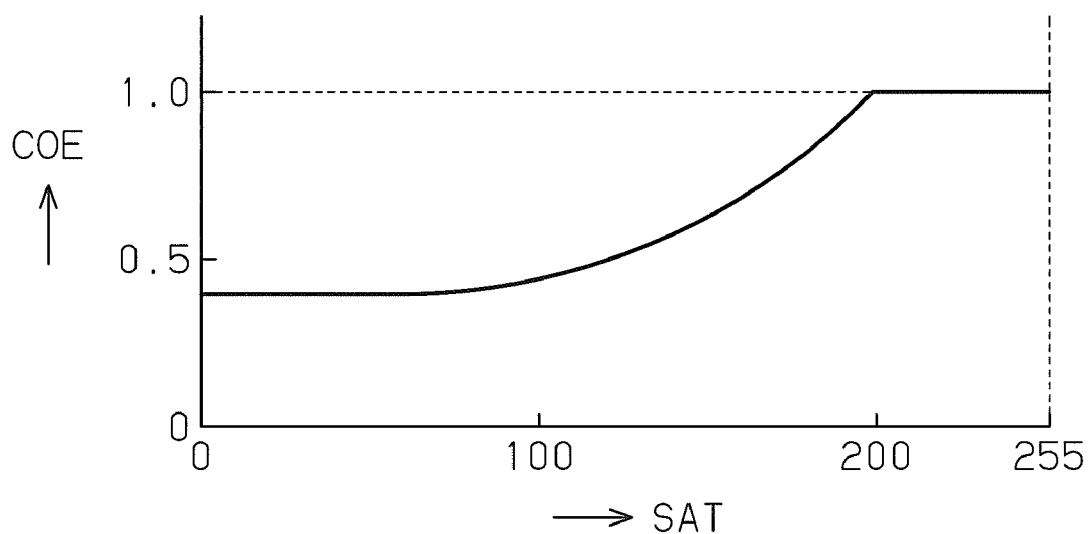
FIG. 5 is a chart illustrating one example of a lookup table used by a modulated light computer according to a second embodiment of the present invention and shows the relationship between an average level difference parameter SAT and a correction coefficient COE.

A video projector according to a second embodiment of the present invention will now be discussed with reference to FIG. 5.

The video projector of the second embodiment differs from that of the first embodiment in the process for calculating the correction coefficient COE with the modulated light computer 55. To avoid redundancy, like or same reference numerals are given to those components that are the same as the corresponding components of the first embodiment.

In the second embodiment, the number of bits for the modulated light computer 55 is eight, and the correction coefficient COE is calculated using a lookup table. More specifically, in the second embodiment, the modulated light computer 55 computes the average level difference parameter SAT through the same procedures as the first embodiment. Further, the modulated light computer 55 computes the correction coefficient COE with a lookup table, which is set beforehand so that the correction coefficient COE varies nonlinearly relative to the average level difference parameter SAT as shown in FIG. 5.

The lookup table is set so that the correction coefficient COE is 1 when the average level difference parameter SAT is greater than or equal to a fixed value. Further, the lookup table is set so that the correction coefficient COE is less than 1 when the average level difference parameter SAT is less than the fixed value and the correction coefficient COE varies gradually.

The second embodiment has the advantages described below.

(5) The correction coefficient COE for the average level difference parameter SAT is determined with the lookup table. The lookup table is generated based on experimental results so as to effectively reduce the temperature load on the LCD panels 22, 32, and 42. The use of such a lookup table allows for further accurate control of the amount of light emitted from the light source 1 toward the LCD panels 22, 32, and 42.

(6) The lookup table is set so that the correction coefficient COE is 1 when the average level difference parameter SAT is greater than or equal to the fixed value. Further, the lookup table is set so that the correction coefficient COE is less than 1 when the average level difference parameter SAT is less than the fixed value and the correction coefficient COE varies gradually. When the average level difference parameter SAT is less than the fixed value, the temperature load applied to the LCD panels 22, 32, and 42 is apt to becoming excessively high. However, in such a state, the correction coefficient COE is maintained at a small value. This accurately prevents the temperature load applied to the LCD panels 22, 32, and 42 from becoming excessively high. Further, when the average level difference parameter SAT is greater than or equal to the fixed value, there is no need to correct the amount of light emitted from the light source 1 to the LCD panels 22, 32, and 42. Further, since the amount of light emitted from the light source 1 to the LCD panels 22, 32, and 42 is not corrected, the picture quality is prevented from decreasing.

It should be apparent to those skilled in the art that the present invention may be embodied in many other specific forms without departing from the spirit or scope of the invention. Particularly, it should be understood that the present invention may be embodied in the following forms.

[Modifications]

In each of the above-described embodiments, the correction of the amount of light emitted from the light source 1 to the LCD panels 22, 32, and 42 is performed by correcting the amount of light emitted by the light source 1 and the amount of light blocked by the light shield 3. However, just the amount of light emitted from the light source 1 may be corrected. In this case, the light shield driver 56b of the emitted light amount control unit 56 and the light shield 3 may be eliminated.

The correction of the amount of light emitted from the light source 1 to the LCD panels 22, 32, and 42 may be performed by just correcting the amount of light blocked by the light shield 3. In this case, the light source driver 56a of the emitted light amount control unit 56 does not have to correct the output of the light source 1.

The light shield 3 may have a structure that does not pivot the light shield plates 3ab as described above. For example, the light shield may be a light transmission plate having elongated openings arranged at predetermined intervals. In this case, the shielded light amount is adjusted by sliding a light shield plate, which includes light shielding portions having about the same width as the openings, on the light transmission plate.

The light shield 3 does not have to be located between the lens groups 2a and 2b of the integrator lens 2, as described above. For example, the light shield 3 may be located between the light source 1 and the LCD panels 22, 32, and 42 like at the emission side of the integrator lens (between the lens group 2b and the polarization converter 4).

In the above-described embodiments, the amount of light emitted from the light source 1 to the LCD panels 22, 32, and 42 is performed in a continuous manner. Instead, the amount of light emitted from the light source 1 to the LCD panels 22, 32, and 42 may be performed in a stepped manner.

To correct the amount of light emitted by the light emitting body of the light source 1, the voltage applied to the light source 1 may be variable. Further, the current flowing to the light source 1 may be restricted.

In the second embodiment, the number of bits for the modulated light computer 55 is eight. However, the modulated light computer 55 may have a different number of bits. For example, when the number of bits for the modulated light computer is ten, the average level difference parameter SAT of the horizontal axis is 0 to 1023.

The present examples and embodiments are to be considered as illustrative and not restrictive, and the invention is not to be limited to the details given herein, but may be modified within the scope and equivalence of the appended claims.

What is claimed is:

1. A video projector for displaying a picture based on a video signal, the video projector comprising:
   a first LCD panel for red light; a second LCD panel for green light;
   a third LCD panel for blue light;
   a light source which emits light toward the first to third LCD panels;
   a modulated light computer which determines a correction coefficient for reducing the amount of light emitted from the light source toward the first to third LCD panels when temperature load of at least one of the first to third LCD panels increases wherein the modulated light computer computes a first average picture level for red light, a second average picture level for green light, and a third average picture level for blue light and determines the correction coefficient in accordance with a deviation between the first to third average picture levels; and
   an emitted light amount control unit which corrects the video signal with the correction coefficient and controls the amount of light emitted from the light source toward the first to third LCD panels.

2. The video projector according to claim 1, wherein the modulated light computer determines the correction coefficient so as to reduce the amount of light emitted from the light source toward the first to third LCD panels when the temperature load of one of the first to third LCD panels exceeds that of another one of the LCD panels.

3. The video projector according to claim 1, wherein the modulated light computer computes an average picture level for each picture of the video signal, and the emitted light amount control unit corrects the average picture level with the correction coefficient.

4. The video projector according to claim 1, wherein the modulated light computer sets the correction coefficient to less than 1 to reduce the amount of light emitted toward the first to third LCD panels when there is a deviation between the first to third picture levels.

5. The video projector according to claim 1, wherein the modulated light computer sets the correction coefficient to less than 1 to reduce the amount of light emitted toward the first to third LCD panels when the amount of the deviation between the first to third average picture levels is greater than a predetermined value.

6. The video projector according to claim 1, wherein the emitted light amount control unit includes a light source driver which controls the amount of light emitted from the light source.

7. The video projector according to claim 1, further comprising:
    a light shield arranged between the light source and the first to third LCD panels;
    wherein the emitted light amount control unit includes a light shield driver which controls the amount of light blocked by the light shield.

8. The video projector according to claim 1, further comprising:
    a light shield arranged between the light source and the first to third LCD panels;
    the emitted light amount control unit including:
        a light source driver which controls the amount of light emitted from the light source; and
        a light shield driver which controls the amount of light blocked by the light shield;
    wherein the amount of light emitted from the light source and the amount of light blocked by the light shield are simultaneously controlled.

9. A video projector for displaying a picture based on a video signal, the video projector comprising:
    a first LCD panel for red light;
    a second LCD panel for green light;
    a third LCD panel for blue light;
    a light source which emits light toward the first to third LCD panels;
    a modulated light computer which determines a correction coefficient for reducing the amount of light emitted from the light source toward the first to third LCD panels when temperature load of at least one of the first to third LCD panels increases; and
    an emitted light amount control unit which corrects the video signal with the correction coefficient and controls the amount of light emitted from the light source toward the first to third LCD panels,
    wherein the modulated light computer uses a first equation to compute a parameter SAT, which indicates an average level difference of the average picture levels for red, green, and blue light, and the modulated light computer decreases the correction coefficient as the parameter SAT decreases, in which the first equation is:

$$SAT = X - (\max(R,G,B) - \min(R,G,B));$$

whereas X represents a constant predetermined by the number of bits of the modulated light computer, max(R, G, B) represents the highest one of the average picture levels R, G, and B, and min(R, G, B) represents the lowest one of the average picture levels R, G, and B.

10. The video projector according to claim 9, wherein the modulated light computer linearly varies the correction coefficient relative to the parameter SAT.

11. The video projector according to claim 10, wherein the modulated light computer uses a second equation to compute the correction coefficient, in which the second equation is:

$$COE = (SAT + K)/(K + X);$$

whereas COE represents the correction coefficient, and K represents a constant set in a range of 0 to X.

12. The video projector according to claim 9, wherein the modulated light computer non-linearly varies the correction coefficient relative to the parameter SAT based on a preset lookup table.

13. The video projector according to claim 12, wherein the lookup table is set so that the correction coefficient is 1 when the parameter SAT is greater than or equal to a fixed value, and the lookup table is set so that the correction coefficient is less than 1 and varies gradually when the parameter SAT is less than the fixed value.

* * * * *